United States Patent
Chung et al.

(10) Patent No.: US 7,590,498 B1
(45) Date of Patent: Sep. 15, 2009

(54) SYSTEM AND METHOD FOR VACUUM CHAMBER LEAK DETECTION

(75) Inventors: Sherk Chung, Emeryville, CA (US); Mukund Chakravarthy Venkatesh, San Francisco, CA (US); Paxton Ming Kai Chow, Walnut Creek, CA (US); Jiuyi Cheng, Milpitas, CA (US); Paul Tran, Sacramento, CA (US); Joseph Raymond Monkowski, Danville, CA (US)

(73) Assignee: Pivotal Systems Corporation, Pleasanton, CA (US)

( * ) Notice: Subject to any disclaimer, the term of this patent is extended or adjusted under 35 U.S.C. 154(b) by 0 days.

(21) Appl. No.: 11/948,907

(22) Filed: Nov. 30, 2007

(51) Int. Cl.
*G01F 17/00* (2006.01)
(52) U.S. Cl. .................................................. 702/51
(58) Field of Classification Search .................. 702/51, 702/76, 81; 156/345.24, 345.27, 345.55
See application file for complete search history.

(56) References Cited

U.S. PATENT DOCUMENTS

| | | | | |
|---|---|---|---|---|
| 3,688,293 A | * | 8/1972 | Sullivan | 340/530 |
| 5,789,754 A | * | 8/1998 | Cathey et al. | 250/372 |
| 6,077,386 A | * | 6/2000 | Smith et al. | 156/345.24 |
| 2005/0037500 A1 | * | 2/2005 | Ciovacco et al. | 436/3 |

* cited by examiner

*Primary Examiner*—Drew A Dunn
*Assistant Examiner*—Stephen J Cherry
(74) *Attorney, Agent, or Firm*—Townsend and Townsend and Crew LLP (57) ABSTRACT

Leaks in a processing chamber, including "virtual leaks" resulting from outgassing of material present within the chamber, may be detected utilizing an optical emission spectroscopy (OES) sensor configured to monitor light emitted from plasma of a sample from the chamber. According to certain embodiments, gas introduced into the chamber by the leak may be detected directly on the basis of its optical spectrum. Alternatively, gas introduced by the leak may be detected indirectly, based upon an optical spectrum of a material resulting from reaction of the gas attributable to the leak. According to one embodiment, data from the OES sensor is received by a processor that is configured to compute a leak detection index. The value of the leak detection index is compared against a threshold to determine if a leak is detected. If the value of the index crosses the threshold, a notification of the existence of a leak is sent.

31 Claims, 5 Drawing Sheets

SYSTEM AND METHOD FOR VACUUM CHAMBER LEAK DETECTION

BACKGROUND OF THE INVENTION

Many types of semiconductor manufacturing equipment include a chamber where processing of the wafers is performed. In certain processes, the chamber is maintained at reduced pressure, and the flow of gases into and out of the chamber is tightly controlled. Examples of elements configured to ensure a controlled flow of gases into such a chamber include but are not limited to mass flow controllers (MFCs), pumps, valves, and seals, which may operate in conjunction to maintain the processing chamber in the desired state. Processes that are sensitive to gas composition may depend on all of these elements working reliably. Where one or more of these components fails to function as expected, the effect on materials being processed within the chamber can be detrimental.

Large leaks in a chamber may be caused by such things as a failed valve or stuck MFC. Such events are generally detectable, and readily corrected by equipment engineers.

By contrast, smaller leaks may arise from more subtle failures, such as a cracked seal, or a valve not fitted sufficiently tightly. Such smaller leaks are often difficult to detect, and may go undetected for quite some time. However, changed composition of gas in the chamber resulting from such smaller leaks can be sufficient to ruin the wafer being processed. The near-invisibility of small leaks, combined with their effect on sensitive recipes, renders such small leaks a significant problem.

Still another type of problem may arise where gas is introduced into the environment of the chamber through a "virtual leak". As used herein, a "virtual leak" refers to the generation of unwanted gas within the chamber itself. One example of such a virtual leak occurs due to outgassing from materials already present within the chamber, such as residue from previous processes. The gas resulting from such a virtual leak can also adversely affect the reliability of processes occurring within a chamber.

From the above, it is seen that improved techniques for detecting leaks in a vacuum chamber are desired.

BRIEF SUMMARY OF THE INVENTION

Leaks in a processing chamber (including "virtual leaks" resulting from outgassing of material present within the chamber), may be detected utilizing an optical emission spectroscopy (OES) sensor configured to monitor light emitted from plasma of a sample of gas from the chamber. According to certain embodiments, gas introduced into the chamber by the leak may be detected directly on the basis of its optical spectrum. Alternatively, gas introduced by the leak may be detected indirectly, based upon an optical spectrum of a material resulting from reaction of the gas attributable to the leak. According to one embodiment, data from the OES sensor is received by a processor that is configured to compute a leak detection index. The value of the leak detection index is compared against a threshold to determine if a leak is detected. If the value of the index crosses the threshold, a notification of the existence of a leak is sent. Various embodiments of the present invention are applicable to detecting leaks in processing chambers configured to operate at below ambient pressure, at greater than ambient pressure, or at ambient pressure.

An embodiment of a method in accordance with the present invention, comprises, detecting an optical emission spectrum from a plasma of a gas sample from a processing chamber, and analyzing the spectrum to detect a gas leak in the processing chamber.

An embodiment of a system for leak detection in accordance with the present invention, comprises, an optical emission spectroscopy (OES) sensor in optical communication with a plasma of a gas from a processing chamber, and a host computer in electrical communication with the OES sensor. The host computer further comprises a controller and a computer readable storage medium in electronic communication with the controller and having stored thereon instructions to direct the controller to receive a spectrum from the OES sensor, and analyze the spectrum to detect a gas leak in the processing chamber Various additional objects, features and advantages of the embodiments of the present invention can be more fully appreciated with reference to the detailed description and accompanying drawings that follow.

DETAILED DESCRIPTION OF THE INVENTION

Leaks in a processing chamber (including "virtual leaks" as a result of outgassing from material already present within the chamber), may be detected utilizing an optical emission spectroscopy (OES) sensor configured to monitor light emitted from plasma of a sample from the chamber. According to certain embodiments, gas introduced into the chamber by the leak may be detected directly on the basis of its optical spectrum. Alternatively, gas introduced by the leak may be detected indirectly, based upon an optical spectrum of a material resulting from reaction of the gas attributable to the leak. According to one embodiment, data from the OES sensor is received by a processor that is configured to compute a leak detection index. The value of the leak detection index is compared against a threshold to determine if a leak is detected. If the value of the index crosses the threshold, a notification of the existence of a leak is sent. Various embodiments of the present invention are applicable to detecting leaks in processing chambers configured to operate at below ambient pressure, at greater than ambient pressure, or at ambient pressure.

Particular embodiments of the present invention describe an approach for detecting small leaks in vacuum chambers utilizing data from an optical emission spectroscopy (OES) sensor. Although the following description refers to a semiconductor plasma-based deposition tool as an example, alternative embodiments of the present invention could be applied to any tool having a processing chamber.

For purposes of this disclosure, a vacuum chamber is defined as a closed vessel where the intake and outtake of materials thereto is desired to be controlled. In such a chamber, a leak could be a physical leak where gas seeps into or out of the chamber. Alternatively, a "virtual" leak could occur where gas is introduced from material inside the chamber, for example via a reaction occurring inside the chamber. Outgassing from material previously deposited on an inner wall of the chamber is an example of this type of leak.

Figure 1:
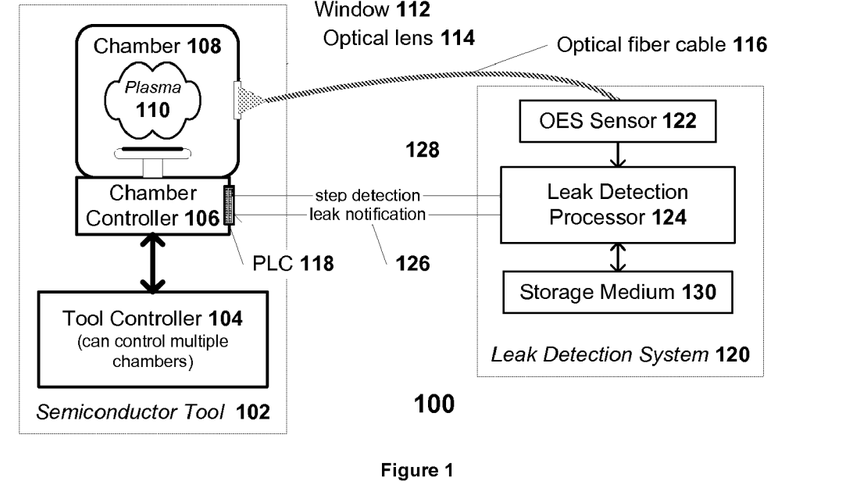
FIG. 1 is a simplified block diagram of plasma chamber having an integrated leak detection system according to an embodiment of the present invention.

FIG. 1 is a simplified block diagram of plasma chamber having an integrated leak detection system according to an embodiment of the present invention. In this particular embodiment, vacuum chamber 108 is part of a semiconductor manufacturing tool 102 which uses plasma 110 to process wafers.

An optical emission spectroscopy (OES) sensor 122 monitors the light emitted from the plasma 110 inside the chamber 108. Data from the OES sensor is received and analyzed by a processor 124. Processor 124 verifies the data for validity and processes said data using an algorithm to determine if a leak is found in the chamber. The results of the algorithm are logged in a file. If a leak is found, a notification is sent to alert the tool operators of the leak. Various details of the methods and apparatuses for such leak detection are provided in the following sections.

Data Acquisition

OES sensors provide data in the form of spectra. A spectrum is a collection of one or more pixels, each pixel representing the detected intensity of a particular wavelength of light. OES sensors contain an internal mapping of pixels to wavelengths. Accordingly, as used herein, the term "value of pixel $p_n$" is used interchangeably with "magnitude of wavelength $w_n$", for a certain pixel $p_n$ and wavelength $w_n$ when referring to a spectral element from a spectrum.

Figure 2:
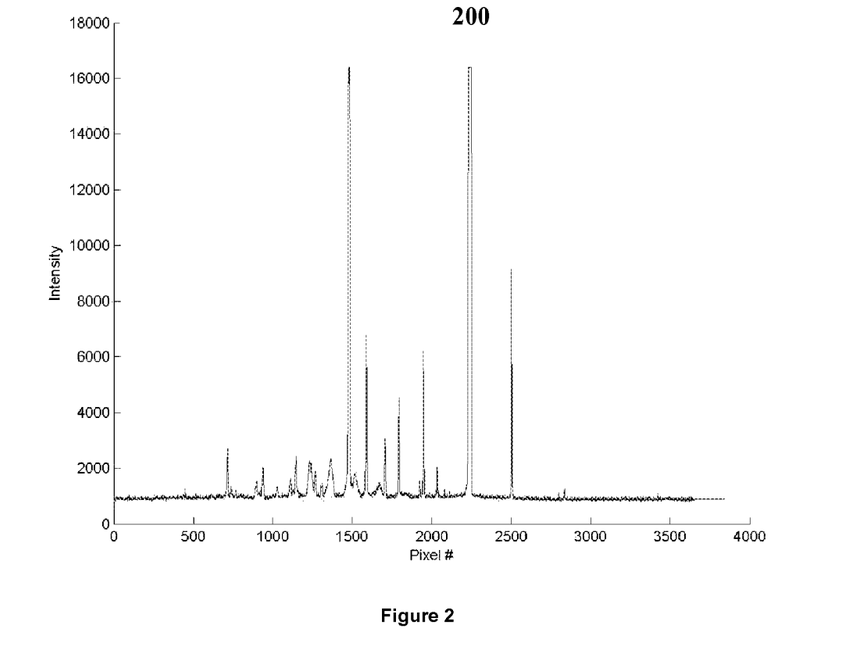
FIG. 2 is an example of an OES spectrum.

One spectrum represents one sample of data, since a spectrum represents the collection of pixels measured at a particular point in time. An example of an OES spectrum is shown in FIG. 2.

Figure 3:
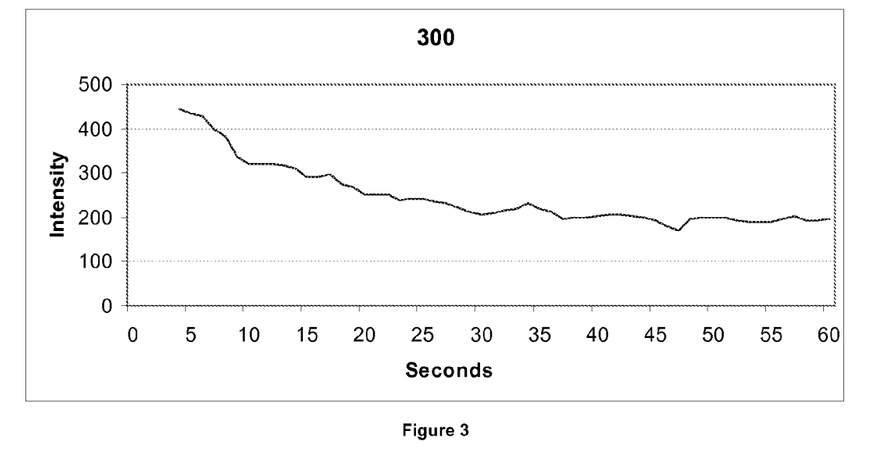
FIG. 3 is an example of a time-series trace created from of a combination of one or more pixels.

A time-series trace can be created from one or more pixels of spectral samples over a period of time. An example of a time-series trace created from spectral samples is shown in FIG. 3. This particular time-series trace plots change in intensity of a peak at about 805 nm, corresponding to Argon, over a period of 60 seconds.

According to particular embodiments, OES sensor 122 can be used to measure the intensity of light at different wavelengths emitted from a plasma source 110 inside the vacuum chamber 108. Typically, lens 114 is positioned at a window 112 on the chamber 108 allowing optical access into the plasma 110. An optical fiber 116 carries to the OES sensor 122, light captured by lens 114. At the OES sensor, a charge coupled device (CCD) or similar light-detecting device measures the intensity of the light received. The OES sensor then provides the information captured from the light-detecting device in the form of optical spectra.

Different gases and compounds from plasma emit light at different wavelengths. Therefore, an OES sensor can be utilized to estimate the composition of gases and compounds inside a plasma chamber.

The particular embodiment just described utilizes an OES sensor configured to measure light from a plasma present within a vacuum process chamber, for example a chamber utilizing the plasma for etching or deposition. Alternative embodiments, however, may be used to monitor processing chambers that do not themselves contain a plasma. For such embodiments, a lack of a plasma light source inside the chamber does not preclude the usefulness of an OES sensor.

Figure 4:
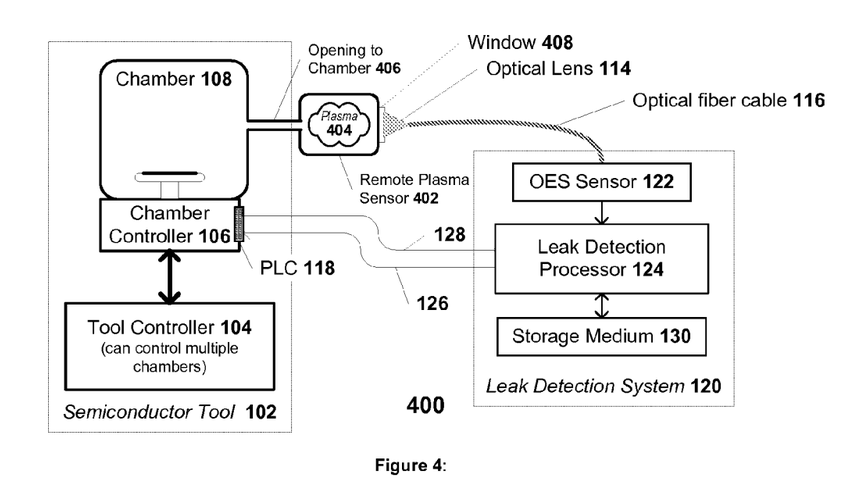
FIG. 4 is a simplified block diagram of plasma chamber having an integrated leak detection system including a remote plasma sensor according to an alternative embodiment of the present invention.

FIG. 4 shows a simplified schematic view of an alternative embodiment of an apparatus for leak detection, which utilizes an OES sensor combined with an additional remote plasma sensor. A remote plasma sensor 402 contains an opening 406 to the process chamber 108 of the semiconductor tool, but is otherwise sealed. Gases from inside the process chamber diffuse into the remote plasma sensor, but the overall pressure of the process chamber is not materially altered by the presence of the remote plasma sensor.

The remote plasma sensor 402 contains a small compartment where it can strike and maintain its own plasma 404 using the gases that were diffused from the process chamber. In addition, the plasma sensor compartment contains a window 408 suitable for placing the lens 114 of an OES sensor 122. The remote plasma sensor 402 strikes a plasma 404 inside its own compartment, which is then used as the light source in accordance with the present invention.

According to certain embodiments of the present invention, the remote plasma sensor and the OES sensor can be combined into a single physical unit. Examples of remote plasma sensors suitable for use according to embodiments of the present invention are available from vendors such as Alcatel, Verionix, and LightWind.

Not all plasma chambers that maintain their own plasma are suitable for direct monitoring with an OES sensor. Some plasma chambers are difficult to monitor using an OES sensor due to practical reasons, such as the lack of an available window for mounting the OES sensor. On such chambers, a remote plasma sensor can also be used to provide the light source for the OES sensor.

Other examples of applications for the remote plasma embodiment include detecting leaks in processing chamber in which a plasma is not ordinarily present, for example thermal-based processes.

Data Validation

Not all OES sensor units provide precisely the same results when measured against a standardized light source such as a National Institute of Standards and Technology (NIST)—traceable calibration light source. Sensor-to-sensor discrepancies can occur for various reasons, including but not limited to variances in manufacturing of the sensor, calibration of the sensor, and drift in the sensor over time. In addition, other problems including but not limited to hardware bugs, firmware bugs, faulty optical cables, EMI noise, temperature shifts, and wear and tear, could cause an OES sensor to produce unreliable spectral data. An error in the recipe used in the process chamber could also result in the generation of unexpected light measurements.

Figure 5:
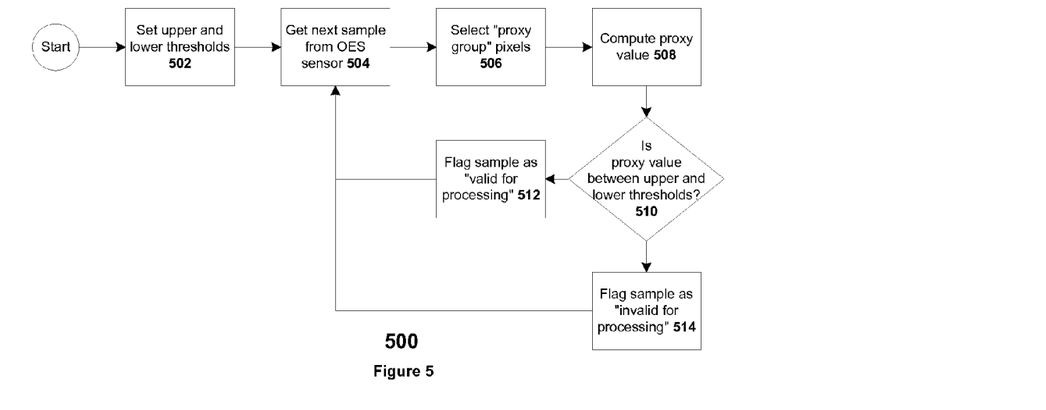
FIG. 5 is a flow diagram of a data verification process according to an embodiment of the present invention.

In view of such potential issues, embodiments of the present invention allow for the verification of OES sensor data prior to analysis of that data to reveal the presence of any leaks. In accordance with one embodiment, steps are taken to verify that the OES sensor data is valid for processing. FIG. 5 is a simplified diagram showing the flow 500 of steps in one such approach for sensor data verification.

Initially, in step 502 the lower and upper thresholds for basic intensity validation are configured to ensure that the light signal is neither so intense as to indicate saturation, nor so faint as to preclude analysis. In step 504, the signal is obtained from the OES sensor. In step 506, a group of one or more wavelengths is selected as the proxy group.

Upon receiving a spectrum from the OES sensor, the pixels whose values represent the wavelengths from the proxy group (i.e., the proxy pixels) are combined using a mathematical formula into a proxy value 508. In step 510, this proxy value is compared to an upper and lower threshold. If the proxy value is between the upper and lower thresholds, data is reported as valid for processing 512. If the proxy value is not within between the upper and lower thresholds, data is reported as invalid for processing 514.

According to an alternative embodiment, multiple proxy values may be compared to upper and lower thresholds. If a percentage of these proxy values do not fall within the thresholds, the data is reported as invalid for processing. In addition, one of the thresholds can be set to zero or a large number, essentially resulting in a comparison of the proxy values to a single threshold.

Values such as the wavelengths for the proxy group, and/or the thresholds, can be selected based on the recipe of the process being performed in the chamber, in order to optimize the validation algorithm for that process.

Any algorithm that can be mathematically reduced to the above-referenced algorithm, would be considered to lie within the scope of the present invention. Consider, for example, an embodiment in which an algorithm compares two groups of wavelengths against each other, rather than comparing a single group of wavelengths against a set of thresholds.

In such an alternative embodiment, a first proxy group of one or more wavelengths is selected, and a second proxy group of one or more wavelengths is also selected. The pixels representing the wavelengths from the first proxy group (i.e., the proxy pixels from the first proxy group) are combined using a mathematical formula into a first proxy value. The pixels representing the wavelengths from the second group (i.e., the proxy pixels from the second proxy group) are combined using a mathematical formula into a second proxy value.

The first proxy value is then subtracted from the second proxy value. If the difference does not fall within an upper and lower threshold, the data is reported as invalid for processing. As subtracting one proxy value from another proxy value is equivalent to creating a single proxy value created by combining all pixels from both groups with a single mathematical equation, the alternative approach just described would fall within the scope of the present invention.

Leak Detection Algorithm

Figure 6:
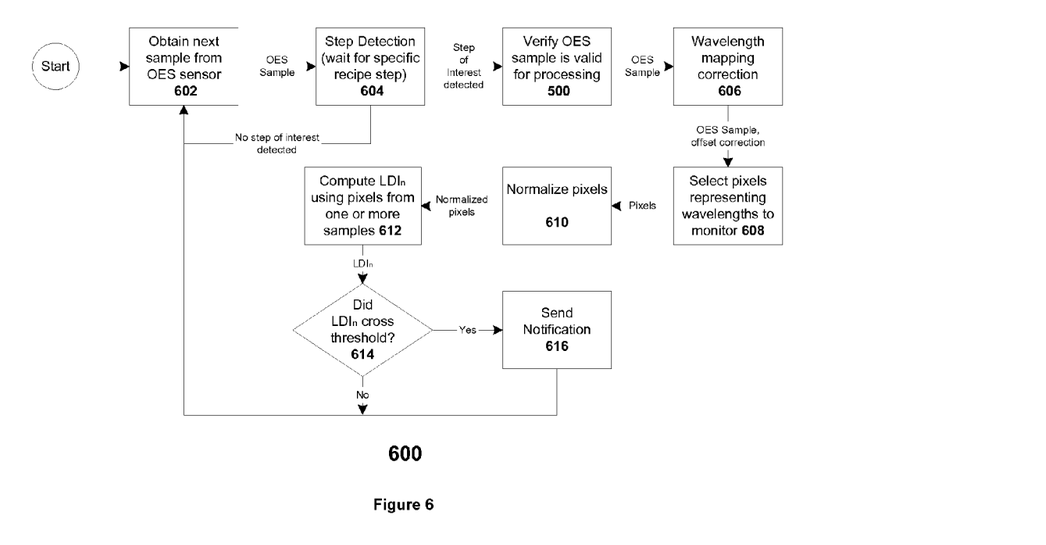
FIG. 6 is a high level data flow diagram of leak detection algorithm according to an embodiment of the present invention.

Once a sample of spectral data has been validated, that sample can next be processed for leak detection. FIG. 6 shows a simplified diagram of an embodiment of a flow 600 of steps for an embodiment of a leak detection algorithm according to the present invention.

In a first step 602, a sample spectrum is obtained from the OES sensor. In a next step 604, if a recipe step of interest is detected from the sample, that sampled spectrum is verified as just described above. If a recipe step of interest is not detected from the sample, another spectrum is sampled per the step 602. Embodiments of methods for determining a step of interest are described further below.

In step 606, a wavelength mapping correction may be performed. Such wavelength mapping correction is described in detail below. In step 608, the pixels representing wavelengths to be monitored, are selected.

Variation in intensity readings between OES sensor units, can make it difficult to maintain consistent threshold levels in the decision algorithm, across different chambers. For example, when attached to a calibration light source, a first sensor unit may produce a reading that differs slightly from a second sensor attached to the same light source. If not accounted for, such differences may ultimately affect the magnitude of the computed Leak Detection Index (LDI), described in detail below. For example, the resulting LDI from the first sensor may be slightly above the leak threshold, whereas the LDI from the second sensor might be slightly below the leak threshold. In view of this and other possible variations, the LDI algorithm shown in FIG. 6 includes the step 610 where sensor readings are normalized to account for variations such as sensor-to-sensor intensity variations.

In step 612, one or more pixels from said sample are combined with one or more pixels from previous samples using a mathematical formula. In one embodiment, the pixels are selected such that they represent the amount of Argon detected in the plasma, since this particular semiconductor process recipes does not contain Argon and the presence of Argon would indicate an atmospheric leak. According to alternative embodiments, however, different pixels would be selected depending on the recipe being processed by the chamber, and thus the present invention is by no means limited to the use of pixels representing Argon.

Application of the mathematical formula in step 612 produces a value called the Leak Detection Index (LDI). In one embodiment, the LDI is a composite index representing the presence of a leak in the monitored chamber.

In step 614, once the LDI is computed, a decision algorithm is applied to the LDI to determine if a leak is detected. In the embodiment shown in FIG. 6, the decision algorithm compares the computed LDI to a threshold 614. If the LDI crosses a threshold, the existence of a leak is identified.

According to alternative embodiments, however, more than one LDI value is used in the decision algorithm. For example, a number of LDI values may be computed at different times, and these plurality of LDI values can be compared to a threshold. In certain embodiments, if a percentage of said values cross the threshold, the existence of a leak is identified.

According to still other embodiments, the value of the LDI may be proportional to the magnitude of a leak. In certain such embodiments, one or more LDI values are compared to multiple thresholds, where each threshold represents a magnitude of a leak. If a leak is detected, the magnitude of said leak is determined by the thresholds that were crossed.

In accordance with yet other embodiments, one or more thresholds may change as a function of time.

The use of threshold-based decision logic represents only one of the many possible ways a decision could be reached. There are a number other methods of computing a decision, including but not limited to decision trees, neural nets, statistical decision algorithms, and probabilistic decision algorithms. Any method which first uses a mathematical formula to compute one or more LDI values, and then applies a second mathematical formula to said LDI values as part of a decision algorithm, could be re-formulated to an equivalent form where said second formula is part of the LDI calculation. Accordingly, any method that applies any formula to the computed LDI values as part of the decision algorithm, would be included as embodiments of the present invention.

In one embodiment, the LDI algorithm contains a step where the value of one pixel is subtracted the value of another pixel from the same spectra, and the resulting difference is used in part to calculate the LDI. In another embodiment, the LDI algorithm contains a step where the value of one pixel is divided by the value of another pixel from the same spectra, and the resulting difference is used in part to calculate the LDI.

Any algorithm that can be mathematically reduced to contain the value of one pixel subtracted from the value of another pixel, simply represents another embodiment of the present invention. Similarly, any algorithm that can be mathematically reduced to contain the value of one pixel divided by the value of another pixel, also represents an embodiment of the present invention.

Wavelength Mapping Correction

In addition to variations in intensity readings from sensor to sensor, the mapping between wavelengths and pixels can also vary between OES sensor units. For example, in comparison with a standardized light source such as a NIST-traceable calibration light source, one sensor may map a particular wavelength to a certain pixel, while another sensor may map that same wavelength to a different pixel. Such variations can occur due to a variety of factors, including but not limited to imprecision in the mapping function of the sensor, imperfect calibration during the manufacturing of the sensor, and sensor drifts. Accordingly, embodiments of the present invention may have a method to correct for differences in the wavelength-to-pixel mapping between OES sensor units.

In certain embodiments, an assumption may be made that the distance between a first pixel and a second pixel is more accurate than the mapping of said first pixel to a particular wavelength. In other words, although the absolute mapping of a pixel to a wavelength may not be accurate, the relative distance between two pixels is consistent with the relative distance between the two wavelengths represented by the pixels.

According to particular embodiments, a well known wavelength containing a clear and distinctive local peak is selected as a reference, and a search range is chosen such that the reference peak is expected to fall within that search range. When a sample is obtained from the OES sensor, the search range is searched for the peak. When the peak is found, its pixel index is subtracted from the expected pixel index as provided by the sensor's wavelength-to-pixel mapping. That difference is then used as an offset to correct the wavelength-to-pixel mappings for one or more other pixels.

According to particular embodiments of the present invention, the wavelength and search range can be selected based on the recipe being processed in the chamber for optimization. In certain embodiments, a pattern-matching algorithm may be applied to multiple pixels in the search range to determine the pixel offset of the reference pattern.

Step Detection

As described above in connection with FIG. 6, it may be desirable to limit leak detection according to embodiments of the present invention to specific recipe steps, and ignore any other processing being performed in the chamber. In such situations, the leak detection system must have the capability to detect whether or not a recipe step "of interest" is in process.

As used herein, "recipe step of interest" refers to a recipe step that is intended to be monitored for leaks. According to certain embodiments, leak notifications may be disabled during any processing performed by the chamber that is not a "step of interest".

In certain embodiments, the leak detection system monitors an external variable that is used to determine, at least in part, whether the recipe step being processed by the chamber is a recipe step of interest. If the recipe step being processed by the chamber is of interest, the leak detection system processes the data from the chamber's OES sensor in order to detect a leak and sends notification upon a leak being found. If a recipe step of interest is not being processed by the chamber, the leak detection system is prevented from sending notification of a leak.

According to one embodiment, the process chamber may be configured to set a designated pin on its programmable logic controller (PLC) 118 to a particular voltage, only when a recipe step of interest is being processed by the chamber. The PLC pin 118 is connected to the leak detection system 122 by a wire 128. The leak detection system 120 monitors the voltage on said wire 128, and if the voltage is greater than a threshold, the leak detection system determines that the recipe step being run by the chamber is of interest.

According to another embodiment, an intermediary circuit or device may be placed between the PLC and the leak detection system. Intermediary devices including but not limited to voltage converters, amplifiers, ground isolators, transformers, filters, and matching networks, could facilitate compatibility between the PLC and the leak detection system.

In accordance with still another embodiment, detection of a recipe step of interest may be performed using, at least in part, event messages from the process tool or automation host. Specifically, the controller of the tool operating the chamber is configured to send an event message at the commencement or conclusion of a process step. Each event message contains an identifier that can be used to identify the step being started or stopped. Such event messages are typically transmitted using the SECS protocol. However, one skilled in the art would recognize that alternative protocols could be used to transmit similar messages and remain within the scope of the present invention.

A leak detection system according to an embodiment of the present invention is configured to monitor the event messages from the tool. Upon seeing a "step start" event, the leak detection system is configured to perform a lookup against a list of recipe steps of interest. If the step identifier contained in the "step start" event matches one of the recipe steps of interest, the leak detection system determines that the recipe step being run by the chamber is of interest until it observes either a "step start" event whose identifier does not match one of the recipe steps of interest, or "step stop" event. In a similar embodiment, the step start or stop event messages may be initiated by a host automation system responsible for controlling the tool, rather than by the controller of a particular tool or tool chamber.

Still other embodiments in accordance with the present invention may utilize periodic status messages from a tool controller that include an identifier of the step being processed by the chamber, for leak detection. Multiple message protocols may be utilized to obtaining such status messages according to embodiments of the present invention, including but not limited to SECS, HSMS, and Interface-A. Regardless of the protocol used, said status messages can be obtained through a variety of methods, including but not limited to directly polling the tool controller, receiving messages pushed from the tool controller, or monitoring message traffic between the tool controller and its corresponding automation host.

The leak detection system monitors the status messages. As long as the step identifier contained in the most recent status message is found among a list of recipe steps of interest, the leak detection system determines that it is in a step of interest. If the step identifier contained in the most recent status message is not found among said list of recipe steps of interest, the leak detection system is prevented from sending notification of a leak. In a similar embodiment, the status messages containing the identifier of the recipe step may be sent by the host automation system rather than the tool controller.

According to still another embodiment, data from the OES sensor of the chamber is used, at least in part, to determine if the chamber is processing a step of interest. For example, a spectral pattern that includes one or more pixels is chosen as the "step pattern". When a spectral sample is received from the OES sensor, the step pattern is compared with the matching pixels from the spectral sample. If there is a match between the pixels of the pre-defined step pattern and the equivalent pixels from the spectral sample to within a tolerance margin, the step being processed is determined to be of interest. To avoid the probability of a spectral sample matching the step pattern due to noise rather than the characteristics of the signal, the step pattern may matched against a number of sequential spectral samples.

In accordance with still another embodiment, the signal from a second sensor may be used, at least in part, to determine if the chamber is processing a step of interest. In one example, one or more variables from a RF sensor in communication with the chamber are monitored by the leak detection system. If the monitored RF variables match a pre-determined pattern (within a tolerance), the step being processed is deemed to be of interest. Similarly, output from a sensor other than an RF sensor could alternatively be used to detect a step of interest for leak detection according to an embodiment of the present invention.

Different variations can be made to the various embodiments of step detection without departing from the scope or spirit of the present invention. For example, any method that uses a derivative of one of the variables used in any of the aforementioned embodiments of step detection, would also fall within the scope of the present invention. Thus, a method of utilizing a third party device that monitors the voltage of a PLC pin, which then notifies the leak detection system via an RS-232 message, is ultimately using a pin of the PLC to aid in the detection of a step according to the present invention.

Notification

Upon detection of a leak in a chamber, a log message may be written into a file recording that a leak has been detected. In some cases, the file is monitored by another system, and when an entry corresponding to a leak appears in the file, that other system notifies a user.

In addition to logging leak detection events into a file, a notification can optionally be sent to ultimately alert a tool operator that a leak has been discovered. According to one embodiment, the notification can be sent in the form on an analog voltage signal.

For example, in the embodiment of FIG. 1 shown above, the leak detection system outputs a voltage to a wire 126 that is connected to an input pin of the PLC of the chamber. A pre-determined voltage is used to signify that no leak has been detected. Upon detection of a leak, the voltage is changed to a second pre-determined value, in order to signify that a leak has been detected. According to an alternative embodiment, the magnitude of the voltage output is directly or inversely proportional relative to the magnitude of the leak detected.

In a particular embodiment, the notification may be sent via a message to the process tool using the SECS protocol. Upon receipt of this message, the process tool is configured by the operator to take the appropriate action. According to another embodiment, the notification may be sent to the automation host instead of to the controller of the process tool. According to certain embodiments, protocols other than SECS could be used to transmit similar notifications.

In accordance with still other embodiments, the leak notification may be sent via email. The leak detection system formats an email message, and sends the email message to an email address via a SMTP or other type of server. An email server ultimately receives the email and makes it available to a user. In some embodiments, the email message is routed to a pager or cellular phone in order to notify the tool operator. The approaches to leak notification are not exclusive, and in still other embodiments, two or more of these notification methods can be used concurrently.

It may be desirable to control the frequency with which such notification messages are sent. Therefore, an embodiment which includes a way of controlling the frequency of notifications, may be used. In one approach, a "notification frequency" configuration parameter may be set by a user that specifies the amount of time that the leak detection system must wait, after sending a notification, before it can send a next notification. When a leak is detected, the timestamp of when the last notification was sent, is compared with the current time. If the difference exceeds a value of the "notification frequency", a notification is sent. If the difference is less than the "notification frequency", the notification is not sent.

Figure 7:
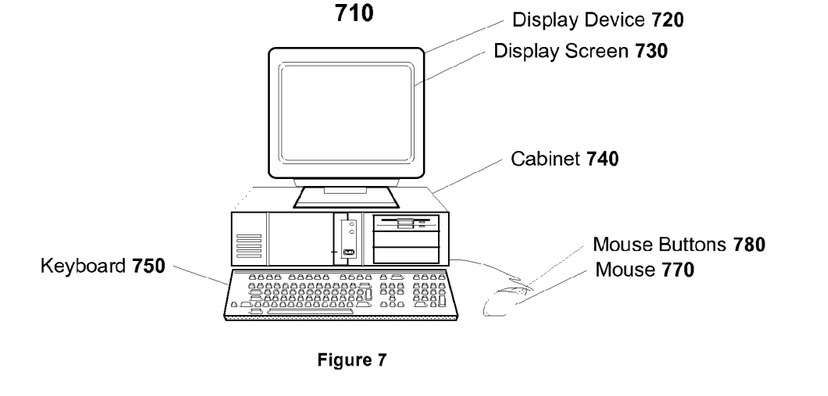
FIG. 7 is a schematic illustration of a computer system for use in accordance with embodiments of the present invention.

As described in detail above, embodiments in accordance with embodiments of the present invention are particularly suited for implementation in conjunction with a computer. FIG. 7 is a simplified diagram of a computing device for processing information according to an embodiment of the present invention. This diagram is merely an example which should not limit the scope of the claims herein. One of ordinary skill in the art would recognize many other variations, modifications, and alternatives. Embodiments according to the present invention can be implemented in a single application program such as a daemon, or can be implemented as multiple programs in a distributed computing environment, such as a workstation, server, personal computer or a remote terminal in a client-server or peer relationship.

FIG. 7 shows computer system 710 including display device 720, display screen 730, cabinet 740, keyboard 750, and mouse 770. Mouse 770 and keyboard 750 are representative "user input devices." Mouse 770 includes buttons 780 for selection of buttons on a graphical user interface device. Other examples of user input devices are a touch screen, light pen, track ball, data glove, microphone, and so forth. FIG. 7 is representative of but one type of system for embodying the present invention. It will be readily apparent to one of ordinary skill in the art that many system types and configurations are suitable for use in conjunction with the present invention. In a preferred embodiment, computer system 710 includes a Pentium® class based computer, running a Linux operating system. However, the apparatus is easily adapted to other operating systems and architectures by those of ordinary skill in the art without departing from the scope of the present invention.

As noted, mouse 770 can have one or more buttons such as buttons 780. Cabinet 740 houses familiar computer components such as disk drives, a processor, storage device, etc. Storage devices include, but are not limited to, disk drives, magnetic tape, solid state memory, bubble memory, etc. Cabinet 740 can include additional hardware such as input/output (I/O) interface cards for connecting computer system 710 to external devices external storage, other computers or additional peripherals, further described below.

Figure 7A:
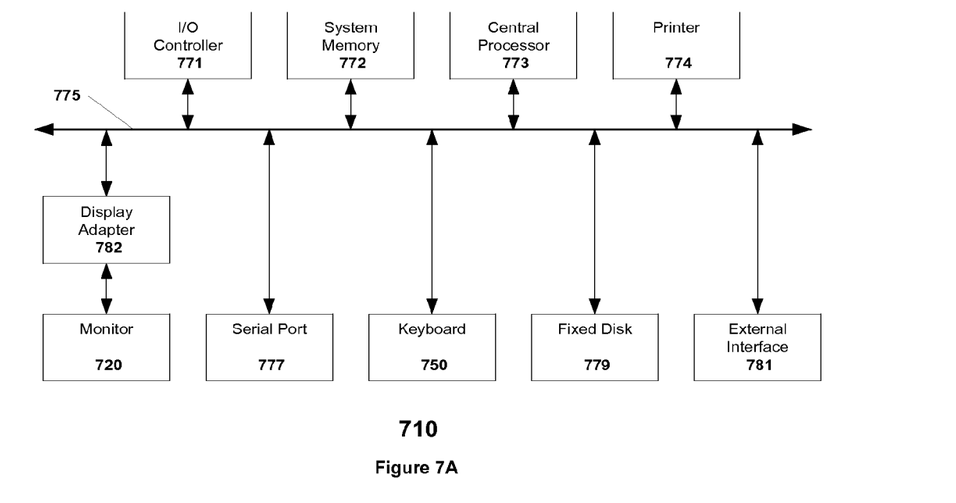
FIG. 7A is an illustration of basic subsystems the computer system of FIG. 7.

FIG. 7A is an illustration of basic subsystems in computer system 710 of FIG. 7. This diagram is merely an illustration and should not limit the scope of the claims herein. One of ordinary skill in the art will recognize other variations, modifications, and alternatives. In certain embodiments, the subsystems are interconnected via a system bus 775. Additional subsystems such as a printer 774, keyboard 750, fixed disk 779, monitor 720, which is coupled to display adapter 782, and others are shown. Peripherals and input/output (I/O) devices, which couple to I/O controller 771, can be connected to the computer system by any number of means known in the art, such as serial port 777. For example, serial port 777 can be used to connect the computer system to a modem 781, which in turn connects to a wide area network such as the Internet. The interconnection via system bus allows central processor 773 to communicate with each subsystem and to control the execution of instructions from system memory 772 or the fixed disk 779, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

While the above description relates to an approach for detecting leaks in a vacuum chamber using an OES sensor, it should be noted that the scope of this invention is not limited to methods and systems employing only a single OES sensor for leak detection. Any leak detection system that uses at a minimum data from at least one OES sensor to detect a leak, whether it uses other sensors or not, falls within the scope of the present invention. For example, a system or method that combines data from an RF sensor with data from an OES sensor using a mathematical formula, in order to compute the equivalent of an LDI, represents simply another embodiment of the present invention.

Moreover, while the discussion so far has related to detection of leaks in a chamber that is configured to operate at lower than atmospheric pressure, (whether or not containing a plasma), this is also not required by the present invention. According to alternative embodiments, the present invention could be utilized to detect virtual leaks in chambers configured to operate at greater than atmospheric pressure, where external gases from an actual leak would not be expected to enter the chamber. In such a scenario, the higher-than-atmosphere chamber is contained inside an external sealed vessel, and the external sealed vessel is monitored for gases leaking into the vessel using an embodiment of the present invention.

Further alternatively, embodiments of the present invention could be utilized to detect leaks into sealed chamber operating at atmospheric pressure, where gas may enter the chamber through a leak from the outside by diffusion, or may be generated in situ as in the case of a virtual leak.

EXAMPLES

Example 1

Leakage of a low pressure chemical vapor deposition (LPCVD) chamber was tested. The step of interest involved a Nitrogen based recipe not containing any Argon, and was performed at a pressure of about 50 mTorr. Because air in the surrounding environment includes trace amounts of Argon, and because Argon exhibited visible peaks in the spectrum for this recipe, the presence of Argon within the chamber during this step was selected to indicate a leak.

Detection of the step of interest was based upon an analog voltage. Specifically, the programmable logic controller of the chamber was configured to output a 24V DC current when the recipe step of interest was being processed, and to output 0V DC current when a recipe of interest was not being processed.

Data was acquired from the chamber utilizing a remote plasma sensor. The remote plasma sensor was equipped with a HR4000 spectrometer obtained from Ocean Optics Inc., of Dunedin, Fla. The HR4000 was configured with a spectral range of 200 nm-1100 nm, with a resolution of approximately 0.5 nm.

Wavelength mapping correction was performed by searching for a peak representing elemental Nitrogen as the reference peak. This peak occurred around pixel 2200. Data validation was employed to verify that intensity value of data at the Nitrogen peak, was somewhere between a lower threshold of 5,000, and an upper threshold of 10,000.

The Leak Detection Index (LDI) was calculated as follows. First, the line (a sum of a group of pixels) was obtained representing elemental Argon, where the group was centered at pixel 2358 plus a fixed offset from the reference peak. Next, the sum of a group of pixels representing a normalization value centered at a different fixed offset from the reference peak, was obtained. The Argon line was then normalized using the normalization value. The Leak Detection Index was calculated according to the following formula:

$$LDI=(Normalized\ Argon+LeakConstant)*ScaleFactor$$

LeakConstant and ScaleFactor are chosen to work with a given sensor and the thresholds in the decision logic. In this example, the LeakConstant was 60, and the ScaleFactor was 10, but these values could vary from recipe to recipe.

Figure 8:
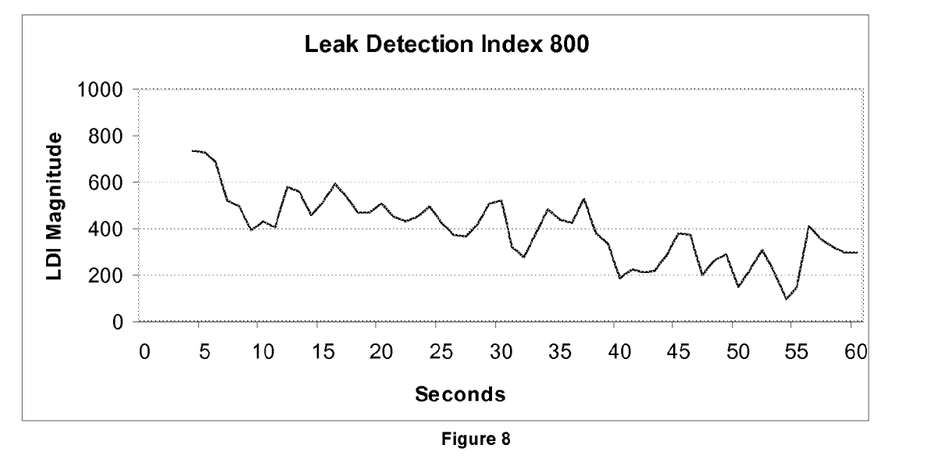
FIG. 8 plots leak detection index for a succession of samples taken over time from an example utilizing argon-based leak detection according to the present invention.

A leak was determined to be found if the calculated LDI was greater than the following step function:

$$f[x]=2000,\ if\ x<=10\ seconds,$$

$$f[x]=1500,\ if\ x>10\ seconds$$

Where a leak was detected, the operator was notified by outputting a 5V DC current to a circuit that amplified it to a 24V DC current for the chamber's PLC. The magnitude of the leak was proportional to the magnitude of the LDI, such that a larger LDI represented a larger leak. FIG. 8 plots LDI versus time for this example.

Example 2

Leakage of the same low pressure chemical vapor deposition (LPCVD) chamber as mentioned above in EXAMPLE 1, was tested for a different leak. The step of interest involved the same Nitrogen-based recipe, and was performed at a pressure of about 50 mTorr. This chamber exhibited a "virtual" oxygen leak resulting from the outgassing of oxygen due to the reaction of the nitride chemistry with material left on the chamber wall from previous depositions. The virtual leak was harmful to the wafer if the magnitude of the virtual leak surpassed a threshold.

Detection of the step of interest was based performed in the same manner as in the previous example. Similarly, data was acquired from the chamber utilizing the same remote plasma sensor and optical sensor as in the previous example.

Wavelength mapping correction was performed by searching for peak that representing elemental Nitrogen as the reference peak. This peak occurred around pixel 2200. Data validation was employed to verify that intensity value of data at the Nitrogen peak, was somewhere between a lower threshold of 5,000, and an upper threshold of 11,000.

The Leak Index was calculated as follows. First, the line (a sum of a group of pixels) was obtained representing Oxygen, where the group was centered at pixel 2491 plus a fixed offset from the reference peak. Next, the sum of a group of pixels representing a normalization value centered at a different fixed offset from the reference peak, was obtained. The Oxygen line was then normalized using the normalization value.

The Leak Detection Index was calculated according to the following formula:

LDI=(Normalized Oxygen+LeakConstant)*ScaleFactor

LeakConstant and ScaleFactor are chosen to work with a given sensor and the thresholds in the decision logic. In this example, the LeakConstant was 0, and the ScaleFactor was 10.

The virtual leak was determined to be harmful if the calculated LDI was greater than 3000.

Figure 9:
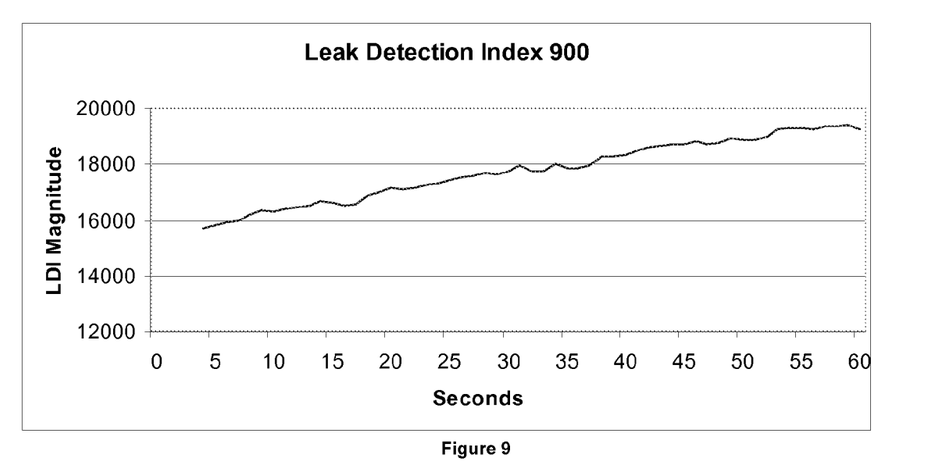
FIG. 9 plots leak detection index for a succession of samples taken over time from an example utilizing oxygen-based detection of a virtual leak according to an alternative embodiment of the present invention.

When a harmful virtual leak was detected, the operator was notified in the same manner as in the previous example. FIG. 9 plots LDI versus time for this example.

While the above discussed use of the invention in connection with a semiconductor plasma tool, embodiments in accordance with the present invention are not limited to uses in the semiconductor industry. Other industries in which this invention may be applicable include but are not limited to the manufacture of plasma and liquid crystal displays, solar panel manufacturing, industrial diamond manufacturing, sapphire manufacturing, and other industries employing tools similar to those used in semiconductor manufacturing.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   detecting an optical emission spectrum from a plasma of a gas sample from a processing chamber; and
   analyzing the spectrum to detect a gas leak in the processing chamber,
   wherein the plasma is maintained in a remote plasma sensor in selective fluid communication with the processing chamber.

2. The method of claim 1 wherein the plasma is maintained in the processing chamber.

3. The method of claim 1 wherein the optical emission spectrum is obtained from an optical emission spectroscopy (OES) sensor.

4. The method of claim 1 wherein the spectrum is analyzed to directly reveal a presence of a gas in the chamber due to the leak.

5. The method of claim 1 wherein the spectrum is analyzed to indirectly reveal a presence of a gas in the chamber due to the leak, based upon an interaction between the gas and contents of the chamber.

6. The method of claim 1 wherein a pressure of the chamber is atmospheric or lower, and the leak contains a gas from outside the chamber.

7. The method of claim 1 wherein the leak is a virtual leak.

8. The method of claim 1 wherein the analyzing comprises comparing the optical emission spectrum with a second optical emission spectrum.

9. The method of claim 8 wherein the second optical emission spectrum is taken at a different point in time from a same run in the processing chamber.

10. The method of claim 1 wherein the analyzing comprises generating a leak detection index by applying a mathematical function to at least a portion of the spectrum.

11. The method of claim 10 wherein said leak detection index is calculated at discrete time intervals.

12. The method of claim 10 wherein a magnitude of the leak detection index is proportional to a magnitude of the leak.

13. The method of claim 10 wherein the analyzing further comprises applying a criterion to the leak detection index to determine if the leak is detected.

14. The method of claim 13 where the criterion comprises comparing the leak detection index to a threshold, and determining the leak to exist if the leak detection index crosses the threshold.

15. The method of claim 1 further comprising transmitting a notification signal upon detection of a leak.

16. The method of claim 15 wherein the notification signal is transmitted by sending an email to an email address, triggering an audio or visual alarm, sending an electronic signal to a host system, or sending an electronic signal to a tool controller.

17. The method of claim 1 further comprising:
   prior to the analyzing, detecting whether a recipe step of interest is being performed in the chamber.

18. The method of claim 17 wherein the detecting is based upon an electronic signal sent from a controller.

19. A method comprising:
   detecting an optical emission spectrum from a plasma of a gas sample from a processing chamber; and
   analyzing the spectrum to detect a gas leak in the processing chamber,
   wherein the analyzing comprises generating a leak detection index by applying a mathematical function to at least a portion of the spectrum, and
   wherein the analyzing comprises:
   combining a first pixel from the spectrum with a second pixel according to a mathematical function to generate the leak detection index, wherein the second pixel is from a second spectrum.

20. The method of claim 19 wherein the mathematical function considers a difference between a value of a first pixel and a value of the second pixel.

21. The method of claim 19 wherein the mathematical function considers a quotient between a value of a first pixel and a value of a second pixel.

22. A method comprising:
   detecting an optical emission spectrum from a plasma of a gas sample from a processing chamber; and
   analyzing the spectrum to detect a gas leak in the processing chamber,
   wherein the analyzing considers data taken from a second sensor in communication with the processing chamber.

23. The method of claim 22 wherein the second sensor is other than an optical sensor.

24. A method comprising:
   detecting an optical emission spectrum from a plasma of a gas sample from a processing chamber; and
   analyzing the spectrum to detect a gas leak in the processing chamber,
   further comprising:
   prior to the analyzing, detecting whether a recipe step of interest is being performed in the chamber, wherein the detecting is based upon an optical signal received indicating a state of the chamber.

25. A method comprising:
   detecting an optical emission spectrum from a plasma of a gas sample from a processing chamber; and
   analyzing the spectrum to detect a gas leak in the processing chamber,
   wherein the analyzing comprises generating a leak detection index by applying a mathematical function to at least a portion of the spectrum,
   wherein the analyzing further comprises applying a criterion to the leak detection index to determine if the leak is detected,
   where the criterion comprises comparing the leak detection index to a threshold, and determining the leak to exist if the leak detection index crosses the threshold, and
   wherein the criterion further comprises comparing the leak detection index to more than one threshold, and wherein an estimate of a magnitude of the leak is determined by a number of thresholds crossed by the leak detection index.

26. A method comprising:
   detecting an optical emission spectrum from a plasma of a gas sample from a processing chamber; and
   analyzing the spectrum to detect a gas leak in the processing chamber,
   wherein the analyzing comprises generating a leak detection index by applying a mathematical function to at least a portion of the spectrum,
   wherein the analyzing further comprises applying a criterion to the leak detection index to determine if the leak is detected, and
   wherein a value of the threshold changes as a function of time.

27. A method comprising:
   detecting an optical emission spectrum from a plasma of a gas sample from a processing chamber; and
   analyzing the spectrum to detect a gas leak in the processing chamber,
   wherein the analyzing comprises generating a leak detection index by applying a mathematical function to at least a portion of the spectrum,
   wherein the analyzing further comprises applying a criterion to the leak detection index to determine if the leak is detected, and
   further comprising:
   detecting a second optical emission spectrum from a plasma of a second gas sample from a processing chamber;
   generating a second leak detection index by applying the mathematical function to the second spectrum and
   applying the criterion to the leak detection index and the second leak detection index to determine if the leak is detected.

28. A system for leak detection comprising:
   an optical emission spectroscopy (OES) sensor in optical communication with a plasma of a gas from a processing chamber; and
   a host computer in electrical communication with the OES sensor, the host computer further comprising:
   a controller, and
   a computer readable storage medium in electronic communication with the controller and having stored thereon instructions to direct the controller to,
   receive a spectrum from the OES sensor, and
   analyze the spectrum to detect a gas leak in the processing chamber,
   wherein the plasma is present within a remote chamber in fluid communication with the processing chamber, and the OES sensor is in optical communication with the remote chamber.

29. The system of claim 28 wherein the computer readable storage medium further comprises code configured to instruct the processor to generating a leak detection index by applying a mathematical function to the spectrum.

30. The system of claim 28 wherein the computer readable storage medium further comprises code configured to instruct the processor to transmit a notification signal upon detection of a leak.

31. The system of claim 28 wherein the computer readable storage medium further comprises code configured to instruct the processor to detect, prior to the analyzing, whether a recipe step of interest is being performed in the chamber.

* * * * *